H. HUBBELL.
SWIVEL CORD GRIP FOR ELECTRIC FIXTURES.
APPLICATION FILED SEPT. 20, 1915.
1,181,451.
Patented May 2, 1916.
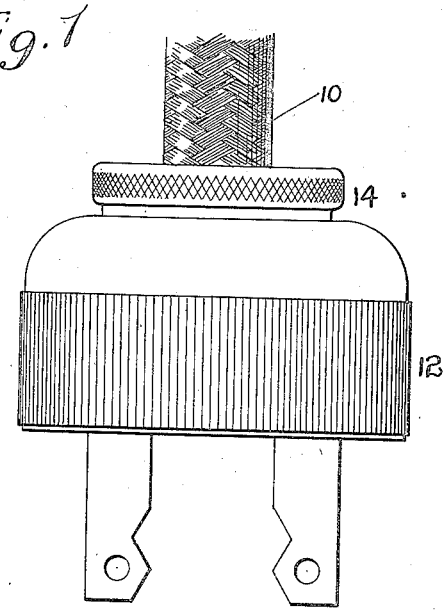
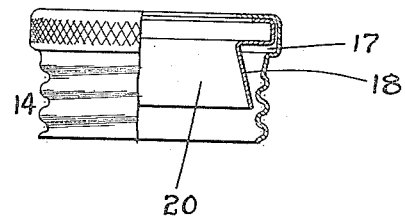
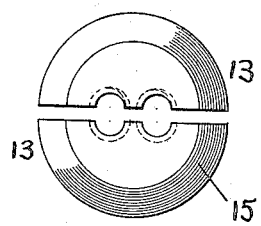
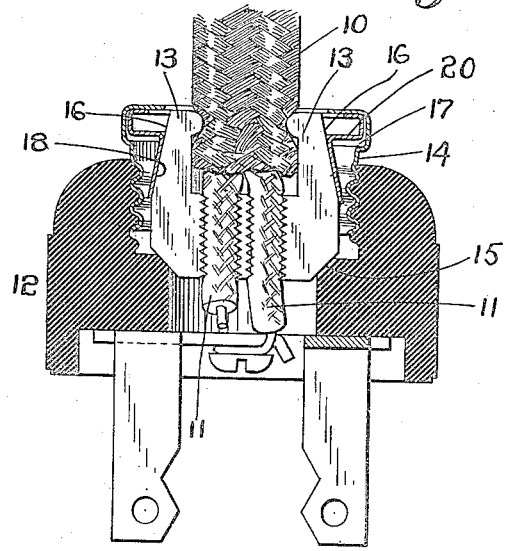
WITNESS
H. W. Meade
INVENTOR
Harvey Hubbell
BY
A. M. Wooster
ATTORNEY

UNITED STATES PATENT OFFICE.

HARVEY HUBBELL, OF BRIDGEPORT, CONNECTICUT.

SWIVEL CORD-GRIP FOR ELECTRIC FIXTURES.

1,181,451.  Specification of Letters Patent.  Patented May 2, 1916.

Application filed September 20, 1915. Serial No. 51,675.

*To all whom it may concern:*

Be it known that I, HARVEY HUBBELL, a citizen of the United States, residing at Bridgeport, county of Fairfield, State of Connecticut, have invented an Improvement in Swivel Cord-Grips for Electric Fixtures, of which the following is a specification.

This invention has for its object to provide a simple and inexpensive grip for connecting the conducting cords to members of fixtures, as for example to plugs and sockets, which will permit the cord to be attached to the fixture member and then securely locked in place without the slightest twisting of the cord.

It is common in grips of this kind to provide double tapered gripping blocks which engage an incline within an externally threaded sleeve and to provide a nut having an internal incline adapted to engage the outer inclines of the gripping blocks. The difficulty with these grips has been that in locking the cord in place, the gripping blocks, instead of engaging the fixture and permitting the nut to be turned thereon, would become locked to the nut so that the gripping blocks would be rotated by the nut and would thus twist the cord. The result has been that in most cases it has been found necessary to attach the cord to the fixture member after the nut had been turned to place, which is a difficult operation, requiring an expert operator and taking considerable time. In order to wholly overcome this difficulty, and to provide a grip that will enable the conducting wires to be attached to the fixture member before the nut is turned to place, and will permit the nut to be rotated freely without danger of twisting the wires, I have devised the novel swivel grip which I will now describe, referring to the accompanying drawing forming a part of this specification and using reference characters to indicate the several parts.

Figure 1 is an elevation on an enlarged scale showing my novel grip applied to a plug cap; Fig. 2 a sectional view illustrating the operation of my novel grip; Fig. 3 a view partly in elevation and partly in section of the nut and sleeve detached, and Fig. 4 is an inverted plan view of the gripping blocks detached.

10 denotes the cord, 11 the insulated conducting wires, 12 a fixture member, in the present instance a plug cap, 13 the gripping blocks, and 14 the nut. The fixture member is provided with a central recess to receive the cord and the gripping blocks and with an internal screw thread which is engaged by the nut. The gripping blocks are of ordinary construction, their upper ends being adapted to engage the cord and their lower ends the insulated wires. The lower ends of the gripping blocks are provided with inclines 15 which are adapted to engage a correspondingly inclined shoulder around the recess in the fixture member and their upper ends are provided with inclines 16, the purpose of which will presently be explained. The nut in the present instance is shown as made of sheet metal, although that is immaterial. It is simply required that there be a central opening through the nut to receive the cord, and that it be provided with an internal circular groove 17.

The gist of my present invention consists in providing within the nut a loose sleeve 20 which lies in the circular groove and is provided with an incline 18 corresponding with and adapted to be engaged by the upper incline 16 upon the gripping blocks, as clearly shown in Fig. 2.

The operation will be obvious from the drawing.

In attaching, the nut with the sleeve loosely in place therein is passed over the cord with the threaded end outward. The lower end of the cord is cut away, leaving the insulation of the wires exposed, and the wires are connected with the binding screws of the fixture in the usual manner. The gripping blocks are then placed in position, the upper ends thereof engaging the cord and the lower ends engaging the insulation of the wires, and then the nut is turned to place. As the nut is turning inward, incline 18 upon the sleeve will engage incline 16 upon the gripping blocks and will force the gripping blocks inward and downward, inclines 15 upon the gripping blocks engaging the incline 19 in the cap, thus causing the blocks to grip both the cord and the insulation of the wires firmly, but without imparting the slightest rotation or twist to the cord or to the insulated wires, for the reason that while the sleeve is causing the blocks to grip the cord and the insulation of the wires, the sleeve itself is not rotated, but the nut rotates freely thereon.

Having thus described my invention, I claim:

1. A device of the character described comprising gripping blocks having upper and lower inclines, a fixture member having an incline adapted to be engaged by the lower inclines of the blocks, a nut admitted to engage the fixture member and having an internal circular recess, and a sleeve lying loosely in said recess and having an incline adapted to engage the upper inclines of the blocks.

2. In a device of the character described, a nut having an external thread and an internal circular recess and a sleeve loosely seated in said recess and provided with an incline, substantially as described, for the purpose specified.

In testimony whereof I affix my signature.

HARVEY HUBBELL.